(12) United States Patent
Montague (10) Patent No.: US 12,049,274 B2
(45) Date of Patent: Jul. 30, 2024

(54) ON-BOARD VEHICLE LOCK (71) Applicant: Metro Mobility, LLC, Cambridge, MA (US)

(72) Inventor: David Montague, Newton, MA (US)

(73) Assignee: Metro Mobility, LLC, Cambridge, MA (US)

( * ) Notice: Subject to any disclaimer, the term of this patent is extended or adjusted under 35 U.S.C. 154(b) by 318 days.

(21) Appl. No.: 17/428,471

(22) PCT Filed: Jan. 31, 2020

(86) PCT No.: PCT/US2020/016084
§ 371 (c)(1),
(2) Date: Aug. 4, 2021

(87) PCT Pub. No.: WO2020/171927
PCT Pub. Date: Aug. 27, 2020

(65) Prior Publication Data
US 2022/0106002 A1  Apr. 7, 2022

Related U.S. Application Data (60) Provisional application No. 62/807,431, filed on Feb. 19, 2019.

(51) Int. Cl.
*B62H 5/00* (2006.01)
*B62H 5/04* (2006.01)
(Continued)

(52) U.S. Cl.
CPC .............. *B62H 5/003* (2013.01); *B62H 5/04* (2013.01); *B62J 7/06* (2013.01); *B62K 19/40* (2013.01); *B62H 2005/008* (2013.01)

(58) Field of Classification Search
CPC . B62H 5/00; B62H 5/003; B62H 5/02; B62H 5/04; B62H 2005/008;
(Continued)

(56) References Cited

U.S. PATENT DOCUMENTS 4,271,690 A * 6/1981 Jaulmes .................. B62H 5/14
224/935
4,708,004 A * 11/1987 Allen ....................... B62H 5/14
70/228
(Continued)

FOREIGN PATENT DOCUMENTS

| CN | 107804416 A | * | 3/2018 | |
| CN | 109263765 A | | 1/2019 | |
| DE | 102004009607 A1 | * | 11/2004 | ............. B62H 5/003 |

OTHER PUBLICATIONS

International Search Report of PCT/US2020/016084 dated May 11, 2020 [PCT/ISA/210].
(Continued)

*Primary Examiner* — Nathan Cumar
(74) *Attorney, Agent, or Firm* — Sughrue Mion, PLLC (57) ABSTRACT

An on-board locking assembly for a vehicle such as a bicycle or scooter comprising a movable member, such as a rigid bar, movably mounted to the vehicle at a first end and releasable from the vehicle at the second end, wherein a vehicle mounted receptacle is configured to fasten and release the second end, and wherein the rigid bar is configured to be movable relative to the vehicle to capture an object to which the vehicle may be fastened, and optionally obstruct the rotation of a vehicle wheel, and wherein the unfastening of the locking assembly may be controlled by wireless signal. A novel on-board retractable cable lock is also presented.

8 Claims, 9 Drawing Sheets

(51) Int. Cl.
 _B62J 7/06_ (2006.01)
 _B62K 19/40_ (2006.01)
(58) Field of Classification Search
 CPC ........ E05B 67/003; E05B 45/005; B62J 7/00; B62J 7/02; B62J 7/04; B62J 7/06; B62J 11/02; B62K 19/00; B62K 19/40; B62K 19/42
 USPC .......................................................... 70/233
 See application file for complete search history.

(56) References Cited

U.S. PATENT DOCUMENTS

| | | | | |
|---|---|---|---|---|
| 5,408,212 A | * | 4/1995 | Meyers | E05B 45/005 340/432 |
| 5,709,113 A | * | 1/1998 | Godfrey | B62H 5/14 70/227 |
| 2005/0011921 A1 | * | 1/2005 | Yang | E05B 67/38 224/427 |
| 2010/0154492 A1 | * | 6/2010 | Ellis | B62H 5/148 70/57 |
| 2014/0265237 A1 | * | 9/2014 | Strother | B62H 3/00 280/297 |
| 2015/0330109 A1 | * | 11/2015 | Tepper | G05B 15/02 700/237 |
| 2016/0333611 A1 | * | 11/2016 | Mabry | B62K 21/16 |
| 2017/0021885 A1 | * | 1/2017 | Montague | B62H 1/04 |
| 2017/0320448 A1 | | 11/2017 | Prescott et al. | |

OTHER PUBLICATIONS

Written Opinion of the International Search Authority of PCT/US2020/016084 dated May 11, 2020 [PCT/IS/237].

* cited by examiner

ON-BOARD VEHICLE LOCK

CROSS REFERENCE TO RELATED APPLICATIONS

This application is a National Stage of International Application No. PCT/US2020/016084 filed on Jan. 31, 2020, claiming priority based on U.S. Provisional Patent Application No. 62/807,431 filed on Feb. 19, 2019.

BACKGROUND

This application claims priority from U.S. Provisional Application No. 62/807,431, filed Feb. 19, 2019, the entire contents of which are herein incorporated by reference.

FIELD OF THE INVENTION

This invention relates to a vehicle fastening system, such as is used in a bicycle or scooter sharing program, comprising a rigid bar movably mounted to the vehicle at one end and releasable from the vehicle at the second end, wherein a vehicle mounted receptacle is configured to fasten and release the second end, and wherein the rigid bar is configured to be movable relative to the vehicle to capture an object to which the vehicle may be fastened. The rigid bar may optionally obstruct the rotation of a vehicle wheel when fastened, and the unfastening of the locking assembly may be controlled by wireless signal. A novel on-board retractable cable lock is also presented.

BACKGROUND INFORMATION

Bike share, scooter share, and other light vehicle rental systems are becoming increasingly popular. Systems that require that a vehicle be "docked" or inserted into a station configured to lock the vehicle are common. Systems where vehicles such as bicycles and scooters are left "dockless" and locked by either not providing propulsion, or locked by locking one or more wheels so as to prevent them from rotating freely are becoming common. Both systems have inherent problems. Docked systems suffer from the inevitable issue that all docking ports are full at a popular station, and empty at an unpopular station. This leads to some users being unable to rent a vehicle, while others have a rental vehicle that they want to return, but are unable to do so at the docking station desired. Dockless systems alleviate these problems by allowing the vehicle to be returned "anywhere" with no docking required (some geographic requirements are common, such as for example returning within a particular city limits). However, dockless systems bring their own set of problems. Complaints have been reported in the media about vehicles being left, for example, blocking sidewalks and wheel chair ramps. Furthermore theft and vandalism has been reported as widespread as the vehicles can be taken away without having to break a lock.

Therefore, there is a need to provide a system which requires that vehicles be locked to an object and are not left blocking sidewalks and wheel chair ramps, while not requiring them to always be returned or rented from a specific docking station. Alternatively, there is a need for a system wherein the user can rent the vehicle from a docking station, but then lock and unlock the vehicle during the course of the rental period in locations other than at a docking station. Finally, there is a need to provide a convenient, easy to use system, which allows, in some cases, for rental, payment, and lock control, among other things, by a computer, and a wireless signal from, for example, a mobile device.

SUMMARY OF THE INVENTION

It is an objective of the present invention to set forth an on-board locking system that travels with the vehicle, is easy and quick to use, and does not include any lose parts that can be lost.

It should be noted that the terms "outward", "upward", "downward", "forward", "rearward" are relative to a vehicle from the perspective of a person occupying the vehicle in the operating position. The terms "lock" and "fasten", and "lockable" and "fastenable", and "locking" and "fastening" are used interchangeably herein. The term "on-board the vehicle" means it always travels with the vehicle, and does not separate from the vehicle during normal usage. The term "movably mounted" means the element can move relative to the mounting assembly, but remains connected during normal usage. The term "slidably mounted" means the element can slide relative to the mounting assembly on which it is mounted, but remains connected during normal usage.

It is a further objective of the present invention to set forth a system that is fastenable to many different types of objects mounted in street settings as well as many different types of vehicle storage stands such as bike racks.

It is a further objective of the present invention to set forth a system that, in some cases, is controlled by wireless signal, either from a server, or from a user device, such as a mobile device including mobile phones. In other cases a key, or onboard keyboard may control locking and unlocking.

It is a further objective of the present invention to set forth a system that locks a wheel such that even if the vehicle is not locked to an object, the vehicle is still not operable.

It is a further objective of the present invention to set forth a system that is useful for both shared mobility vehicles as well as private vehicles.

It is a further objective of the present invention to set forth a system that functions on different types of vehicles including, but not limited to, bicycles and scooters, electric, and human powered.

In accordance with a first aspect of the present invention, an on-board locking assembly for a vehicle is presented comprising; a rigid bar movably mounted to the vehicle, a rigid bar first end connected to the vehicle, a rigid bar second end releasable from the vehicle, a mounting assembly for movably mounting the rigid bar first end, a receptacle mounted on the vehicle configured to receive the rigid bar second end, wherein the rigid bar is configured to be movable relative to the vehicle to capture an object to which the vehicle may be fastened between the rigid bar and the vehicle, and wherein the rigid bar second end is configured to fasten to the receptacle.

In accordance with a second aspect of the present invention, an on-board locking assembly for a vehicle is presented wherein the rigid bar is configured in a non-straight configuration, and is comprised of at least a first section and a second section, wherein the first section and the second section are integrally formed in the rigid bar.

In accordance with a third aspect of the present invention, an on-board locking assembly for a vehicle is presented wherein the first section is slidably mounted to the mounting assembly.

In accordance with a fourth aspect of the present invention, an on-board locking assembly for a vehicle is presented wherein the rigid bar is configured to pivot about an axis coaxial with a centerline of the first section relative to the mounting assembly.

In accordance with a fifth aspect of the present invention, an on-board locking assembly for a vehicle is presented wherein the rigid bar is configured to slide longitudinally along the first section relative to the mounting assembly.

In accordance with a sixth aspect of the present invention, an on-board locking assembly for a vehicle is presented wherein the rigid bar first end is configured to prevent the rigid bar first end from exiting the mounting assembly thereby retaining the rigid bar to the vehicle.

In accordance with a seventh aspect of the present invention, an on-board locking assembly for a vehicle is presented wherein the rigid bar first end is mounted to the mounting assembly in a pivoting manner.

In accordance with an eighth aspect of the present invention, an on-board locking assembly for a vehicle is presented further comprising a vehicle steering assembly, wherein the mounting assembly is mounted to the vehicle steering assembly.

In accordance with a ninth aspect of the present invention, an on-board locking assembly for a vehicle is presented further comprising a locking position for the rigid bar and a riding position for the rigid bar, and wherein the locking assembly is configured to require the rigid bar pivot about an axis relative to the mounting assembly to move from the locking position to the riding position.

In accordance with a tenth aspect of the present invention, an on-board locking assembly for a vehicle is presented further comprising a vehicle wheel, wherein the locking assembly is configured to cause the rigid bar to obstruct the rotation of the vehicle wheel when the rigid bar second end is fastened to the receptacle.

In accordance with an eleventh aspect of the present invention, an on-board locking assembly for a vehicle is presented further comprising a biasing means to bias the rigid bar to a position appropriate for vehicle operation, or to a locked position.

In accordance with a twelfth aspect of the present invention, an on-board locking assembly for a vehicle is presented further comprising a locking position for the rigid bar and a riding position for the rigid bar, and wherein the locking assembly is configured to require the rigid bar pivot about an axis coaxial with the centerline of the first section relative to the mounting assembly to move from the locking position to the riding position.

In accordance with a thirteenth aspect of the present invention, an on-board locking assembly for a vehicle is presented wherein the second section is positioned above the first section in the riding position, and the second section is positioned to the side of the first section in the locking position.

In accordance with a fourteenth aspect of the present invention, an on-board locking assembly for a vehicle is presented further comprising multiple locking positions to accommodate locking to the object when the object is positioned in a generally horizontal position, and locking to the object when the object is positioned in a generally vertical position.

In accordance with a fifteenth aspect of the present invention, an on-board locking assembly for a vehicle is presented further comprising one or more sensors, wherein the one or more sensors are configured to sense at least one of the presence of the object when the rigid bar is fastened around the object, and the presence of the rigid bar second end when inserted in the receptacle.

In accordance with a sixteenth aspect of the present invention, an on-board locking assembly for a vehicle is presented wherein at least one of the locking and the unlocking of the locking assembly is controlled by wireless signal.

In accordance with a seventeenth aspect of the present invention, an on-board locking assembly for a vehicle is presented wherein the receptacle is further configured to receive a station locking member configured as part of a station to fasten the vehicle to said station.

In accordance with an eighteenth aspect of the present invention, an on-board locking assembly for a vehicle is presented further comprising a vehicle battery, wherein the receptacle is further configured to be a charging port to receive a station locking and charging member configured as part of a station to fasten the vehicle to the station and to charge the vehicle battery.

In accordance with a nineteenth aspect of the present invention, an on-board locking assembly for a vehicle is presented further comprising a vehicle luggage carrier, wherein the mounting assembly is mounted to the vehicle luggage carrier.

In accordance with a twentieth aspect of the present invention, an on-board locking assembly for a vehicle is presented further comprising an angle limiting element wherein the pivot about an axis coaxial with a centerline of the first section is limited in angle by the angle limiting element to facilitate the inserting of rigid bar second end into the receptacle.

In accordance with a twenty-first aspect of the present invention, a multi-purpose component for vehicle locking and luggage carrying is presented comprising; a rigid bar movably mounted to the multi-purpose component, a rigid bar first end connected to the multi-purpose component, a rigid bar second end releasable from the multi-purpose component, a mounting assembly for movably mounting the rigid bar first end, a receptacle mounted on the multi-purpose component configured to receive the rigid bar second end, wherein the rigid bar is configured to be movable relative to the mounting assembly to capture an object to which the vehicle may be fastened between the rigid bar and the multi-purpose component, and wherein the rigid bar second end is configured to fasten to the receptacle.

In accordance with a twenty-second aspect of the present invention, a multi-purpose component vehicle lock and mudguard is presented comprising; a rigid bar movably mounted to the multi-purpose component, a rigid bar first end connected to the multi-purpose component,
  a rigid bar second end releasable from the multi-purpose component, a mounting assembly for movably mounting the rigid bar first end, a receptacle mounted on the multi-purpose component configured to receive the rigid bar second end, wherein the rigid bar is configured to be movable relative to the multi-purpose component to capture an object to which the vehicle may be fastened between the rigid bar and the multi-purpose component, and wherein the rigid bar second end is configured to fasten to the receptacle.

In accordance with a twenty-third aspect of the present invention, a method for locking an on-board vehicle lock is presented comprising; a rigid bar movably mounted to said vehicle, a rigid bar first end connected to the vehicle, a rigid bar second end releasable from the vehicle, a mounting assembly for movably mounting the rigid bar first end, a receptacle mounted on the vehicle configured to receive the rigid bar second end, wherein the rigid bar is moved relative to the vehicle to capture an object to which the vehicle may be fastened between the rigid bar and the vehicle, and wherein the rigid bar second end is fastened to the receptacle.

In accordance with a twenty-fourth aspect of the present invention, an on-board locking assembly for a vehicle is presented comprising; a flexible cable movably mounted to the vehicle, a flexible cable first end connected to the vehicle, a flexible cable second end releasable from the vehicle, a mounting assembly for movably mounting the flexible cable first end, a receptacle mounted on the vehicle configured to receive the flexible cable second end, wherein the flexible cable is configured to be movable relative to the vehicle to capture an object to which the vehicle may be fastened between the flexible cable and the vehicle, and wherein the flexible cable second end is configured to fasten to the receptacle.

In accordance with a twenty-fifth aspect of the present invention, a retractable bicycle fastening cable system is presented comprising: a bicycle with bicycle frame, a flexible retractable cable with a first end slidably fastened to the bicycle and a second end comprising a locking cable end, a cable storage element mounted on the bicycle, a cable end receiver mounted on the bicycle, a bicycle rear wheel with a rotational axis, wherein at least a portion of the cable storage element is positioned longitudinally along the bicycle not more than 25 degrees from a line parallel to the direction of travel, and wherein the cable storage element has a first end positioned closer to the back of the bicycle and a second end positioned closer to the front end of the bicycle, and wherein the retractable cable is retractable to a position for storage in the cable storage element during riding, and wherein the retractable cable in the position for storage in the cable storage element is positioned in a generally linear or curved manner, and not in a manner with one coil or more, and wherein, in the position for storage, the retractable cable second end protrudes from the second end of the cable storage element at a position extending forward on the bicycle, and wherein the retractable cable is extendable out of the cable storage element to lock the bicycle to a object, and wherein the unlocking of the retractable cable is configured to be controlled at least in part by wireless signal.

In accordance with a twenty-sixth aspect of the present invention, a retractable bicycle fastening cable system is presented further comprising a seat tube on the bicycle frame wherein the second end of the cable storage element is positioned within 15 cm of the seat tube.

In accordance with a twenty-seventh aspect of the present invention, a retractable bicycle fastening cable system is presented further comprising a down tube on the bicycle frame wherein the second end of the cable storage element is positioned on the down tube.

In accordance with a twenty-eighth aspect of the present invention, a retractable bicycle fastening cable system is presented wherein the cable storage element is the down tube.

In accordance with a twenty-ninth aspect of the present invention, a retractable bicycle fastening cable system is presented wherein the locking cable end is fastenable to the locking cable end receiver mounted on the bicycle.

In accordance with a thirtieth aspect of the present invention, a retractable bicycle fastening cable system is presented wherein the bicycle further comprises an electric motor and battery, and wherein the cable end receiver comprises an electrical conducting element, and wherein said battery is configured to be rechargable using the cable end receiver.

In accordance with a thirty-first aspect of the present invention, a retractable bicycle fastening cable system is presented wherein the unlocking of the locking cable end to the cable end receiver is configured to be actuated by a wireless and keyless remote signal.

In accordance with a thirty-second aspect of the present invention, a retractable bicycle fastening cable system is presented wherein the unlocking of the locking cable end to the cable end receiver mounted on the bicycle is configured to be actuated by a wireless and keyless remote signal.

In accordance with a thirty-third aspect of the present invention, a retractable bicycle fastening cable system is presented further comprising a rear wheel fender, wherein the cable storage element is integrally formed with the rear wheel fender.

In accordance with a thirty-fourth aspect of the present invention, a retractable bicycle fastening cable system is presented further comprising a rear wheel fender, wherein the cable storage element is supported by the rear wheel fender, but is not integrally formed with the rear wheel fender.

In accordance with a thirty-fifth aspect of the present invention, a retractable bicycle fastening cable system is presented wherein a portion of the cable storage element is positioned radially around the rotational axis of the rear wheel.

In accordance with a thirty-sixth aspect of the present invention, a retractable bicycle fastening cable system is presented further comprising a spring, wherein the spring is configured to bias the retractable cable into the cable storage element.

In accordance with a thirty-seventh aspect of the present invention, a retractable bicycle fastening cable system is presented, configured to require a user to manually retract the retractable cable into the cable storage element.

In accordance with a thirty-eighth aspect of the present invention, a retractable bicycle fastening cable system is presented wherein the cable storage second end is configured to prevent the retractable cable first end from exiting the retractable cable storage element.

In accordance with a thirty-ninth aspect of the present invention, a retractable bicycle fastening cable system is presented wherein the retractable cable second end protrudes from the cable storage element in a direction toward forward on the bicycle.

In accordance with a fortieth aspect of the present invention, a retractable bicycle fastening cable system is presented wherein the retractable cable first end, in the retracted position, is positioned below the retractable cable second end.

In accordance with a forty-first aspect of the present invention, a retractable bicycle fastening cable system is presented wherein a front portion of the retractable cable storage element is linear and parallel to the direction of travel of the bicycle, and a rear portion of the retractable cable storage element is positioned radially around the rotation axis of the rear wheel.

In accordance with a forty-second aspect of the present invention, an on-board locking assembly is presented wherein the vehicle is a bicycle.

In accordance with a forty-third aspect of the present invention, an on-board locking assembly is presented wherein the vehicle is a scooter.

In accordance with a forty-fourth aspect of the present invention, an on-board locking assembly for a scooter is presented, comprising: a movable member movably mounted to the scooter, a movable member first end connected to the scooter, a movable member second end releasable from the scooter, a mounting assembly for movably mounting the movable member first end, a receptacle mounted on the scooter configured to receive the movable member second end, wherein the movable member is configured to be movable relative to the scooter to capture an object to which the scooter may be fastened between the movable member and the scooter, and wherein the movable member second end is configured to fasten to the receptacle.

In accordance with a forty-fifth aspect of the present invention, an on-board locking assembly for a scooter is presented, wherein the movable member is a rigid bar.

In accordance with a forty-sixth aspect of the present invention, an on-board locking assembly for a scooter is presented, wherein the movable member is a flexible cable.

In accordance with a forty-seventh aspect of the present invention, an on-board locking assembly for a scooter is presented, further comprising a steering assembly, wherein the movable member is mounted to the steering assembly.

In accordance with a forty-eighth aspect of the present invention, an on-board locking assembly for a scooter is presented, wherein the steering assembly further comprises a handlebar, wherein the movable member is mounted to the handlebar.

In accordance with a forty-ninth aspect of the present invention, an on-board locking assembly for a scooter is presented, wherein at least one of the locking and unlocking of the locking assembly is controlled by wireless signal.

In accordance with a fiftieth aspect of the present invention, an on-board locking assembly for a scooter is presented, wherein at least one of the locking and unlocking of the locking assembly is controlled by a key or keyboard.

BRIEF DESCRIPTION OF THE DRAWINGS

This invention has additional advantages and features which will be apparent from the accompanying drawings, in which.

DETAILED DESCRIPTION OF EMBODIMENTS

Selected embodiments of the present invention will be described in the following, and shown in the figures. It will be apparent to those skilled in the art that these descriptions and figures are provided for illustration purposes only and not for the purpose of limiting the scope of the invention which is as defined by the included claims and their equivalents. Like reference numerals designate corresponding or identical elements throughout the drawings. Many elements of the electric vehicles of the present invention can be found on standard conventional vehicles, and are therefore, in some cases, not labeled and/or not shown as their use is well known and not novel to the present invention.

Figure 1:
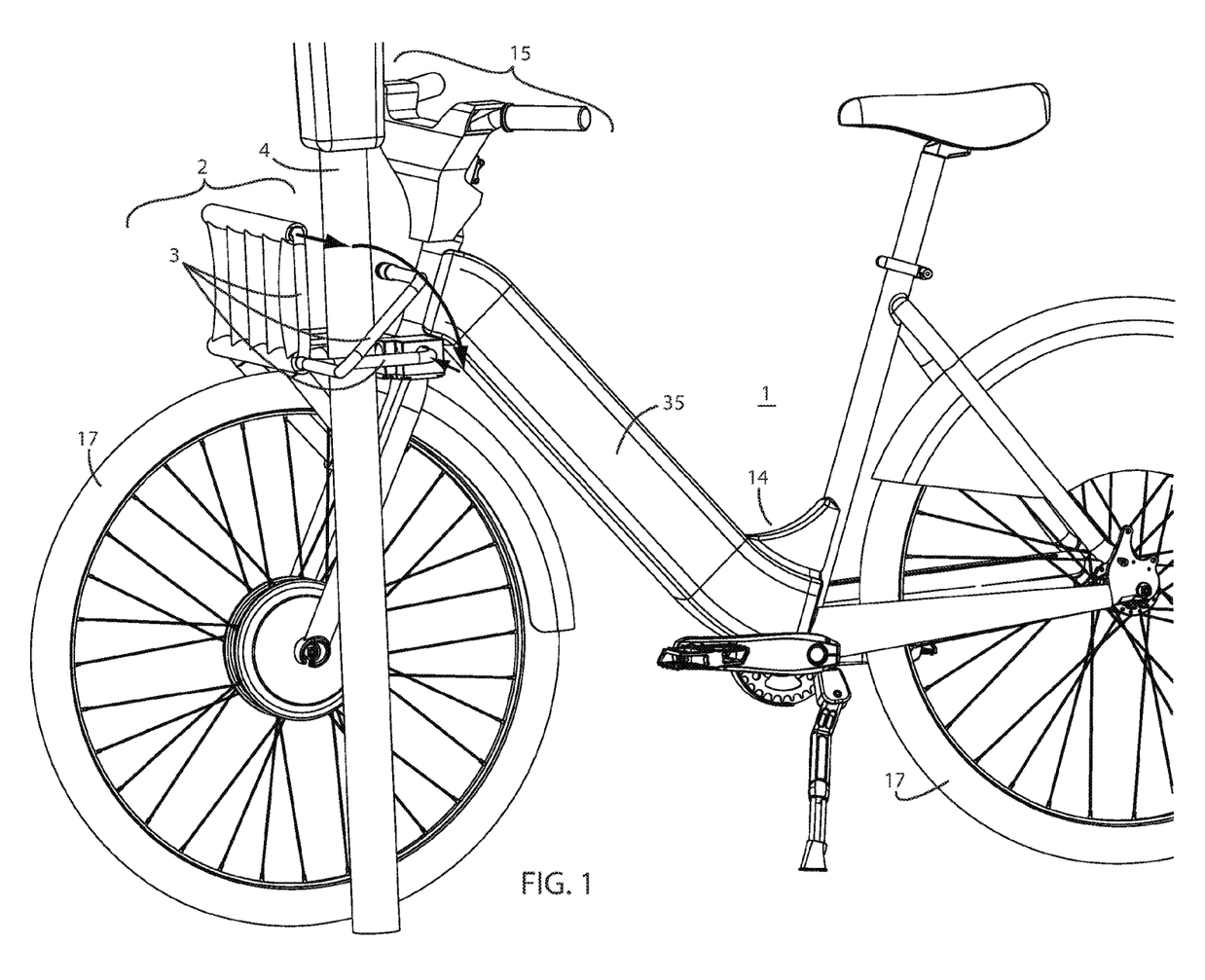
FIG. 1 depicts a perspective view of one example of an on-board locking assembly for a vehicle, shown as an electric bicycle, where the rigid bar has been moved relative to the vehicle to capture the object, in this case a parking meter, to which the vehicle is fastened.

According to one embodiment of the present invention, referring now to FIG. 1, vehicle 1 is shown as an electric bicycle locked to object 4 using on-board locking assembly 2, with rigid bar 3 shown in three different positions during the act of capturing object 4 between rigid bar 3 and on-board locking assembly 2. Shown is an electric bike with vehicle frame 14 with a motor mounted in the front hub and a vehicle battery 35 mounted in the down tube. The present invention is compatible with a number of different vehicles including electric bicycles, pedal bicycles, scooters, electric scooters, neighborhood electric vehicles, and other vehicles, both public/shared and private. Any number of configurations of electric bicycles would be compatible with the present invention, and are not shown. For example, while the hub motor is shown in the front wheel 18, it could easily be situated in the rear wheel 17, or a mid-drive motor could be used. Likewise, the vehicle battery 35 is shown in the down tube 51, but could easily be located elsewhere, such as in the position of a rear luggage carrier 16. Object 4 is shown as a parking meter, but can be any number of different items typically found on the street, or can be a bicycle rack. Rigid bar 3 is shown with a pivot in front and the releasable end pivoting from above the pivot point, to behind and next to the pivot point. As will be shown herein, this configuration can change without departing from the scope of this invention. Finally, a flexible cable could be substituted for rigid bar 3. In this case, an on-board locking assembly 2 for a vehicle 1 comprises; a flexible cable movably mounted to said vehicle 1, a flexible cable first end 41 connected to said vehicle 1, a flexible cable second end 42 releasable from said vehicle 1, a mounting assembly 6 for movably mounting said flexible cable first end 41, a receptacle 5 mounted on said vehicle 1 configured to receive said flexible cable second end 42, wherein said flexible cable is configured to be movable relative to said vehicle 1 to capture an object 4 to which said vehicle 1 may be fastened between said flexible cable and said vehicle 1, and wherein said flexible cable second end 42 is configured to fasten to said receptacle 5.

Figure 2:
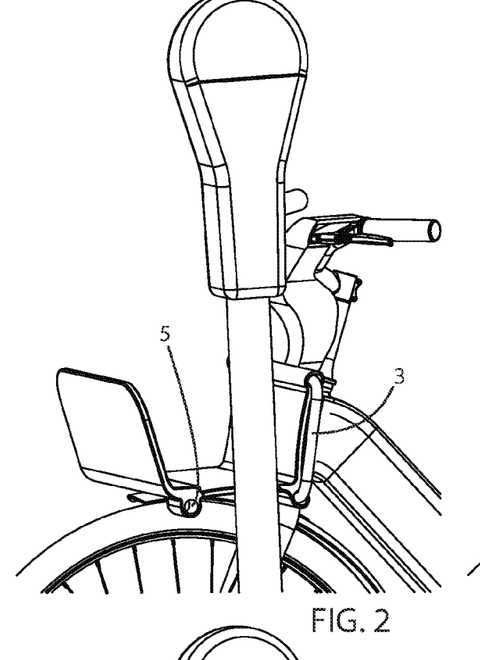
FIG. 2 depicts a perspective view of one example of an on-board locking assembly for the vehicle shown in FIG. 1, where the rigid bar is in the riding position, and the vehicle has been moved to be adjacent to the object, in this case a parking meter, to which the vehicle will be fastened. It is the first of a sequence of four figures showing the process of fastening the vehicle to the object.
Figure 3:
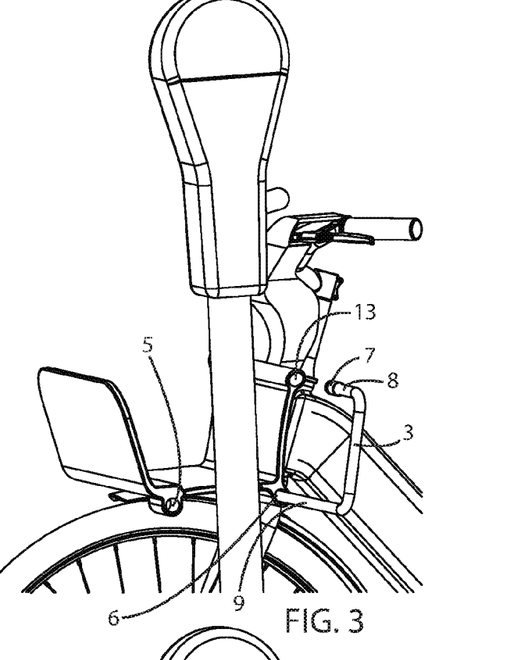
FIG. 3 depicts a perspective view of one example of an on-board locking assembly for the vehicle shown in FIG. 1, where the rigid bar has been pulled outward from the riding position thereby releasing the rigid bar second end. It is the second of a sequence of four figures showing the process of fastening the vehicle to the object.
Figure 4:
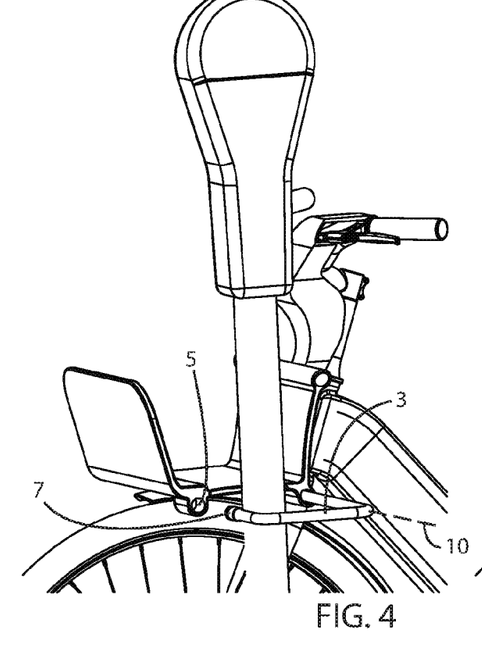
FIG. 4 depicts a perspective view of one example of an on-board locking assembly for the vehicle shown in FIG. 1, where the rigid bar has been rotated about the rigid bar first end from the position shown in FIG. 3 to a position where rigid bar second end lines up with the receptacle. It is the third of a sequence of four figures showing the process of fastening the vehicle to the object.
Figure 5:
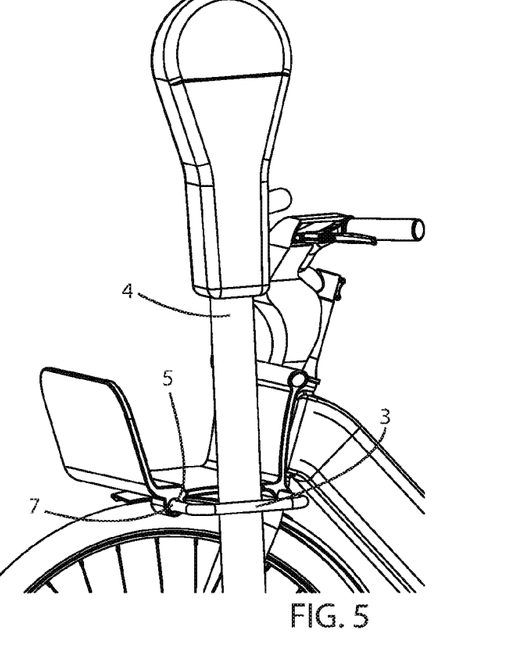
FIG. 5 depicts a perspective view of one example of an on-board locking assembly for the vehicle shown in FIG. 1, where the rigid bar has been pushed inward from the position shown in FIG. 4 to a position where rigid bar second end is fastened in the receptacle and the object, in this case a parking meter, is captured by the rigid bar and the vehicle. It is the fourth of a sequence of four figures showing the process of fastening the vehicle to the object.

Referring now to FIG. 2 through FIG. 5, shown is the electric bicycle of FIG. 1 being locked to object 4 in a sequence of four figures. FIG. 2 shows rigid bar 3 in riding position 12 while receptacle 5 is not used. FIG. 3 shows rigid bar 3 having been pulled outward from riding position 12 exposing second section 8 and rigid bar second end 7 as well as first section 9. Rigid bar second end 7 has exited releasable end holder 13. In this case rigid bar 3 slides longitudinally along first section 9 in mounting assembly 6. Shown in FIG. 3 is an orientation where releasable end holder 13 is positioned above mounting assembly 6 and receptacle 5 is positioned next to mounting assembly 6. However, it may be desired to position releasable end holder 13 next to mounting assembly 6 and receptacle 5 above mounting assembly 6, or releasable end holder 13 next to mounting assembly 6 and receptacle 5 below mounting assembly mounting assembly 6. It is also possible that receptacle 5 may be positioned partially above or below, and partially next to mounting assembly mounting assembly 6. Furthermore, it may be desirable to position receptacle 5 and releasable end holder 13 in the same location. Finally, in this case, mounting assembly 6 is shown behind receptacle 5 (relative to the direction of movement of the vehicle 1), however, it might be desirable to position mounting assembly 6 in front of receptacle 5, with all of the above options available in this new configuration. FIG. 4 shows having been rotated about the axis coaxial with centerline of first section 10 such that rigid bar second end 7 is positioned to enter receptacle 5. In going from the position shown in FIG. 3 to the position shown in FIG. 4, rigid bar second end 7 must be far enough outward to bypass object 4. Finally, FIG. 5 shows rigid bar second end 7 having entered and fastened to receptacle 5 thereby capturing object 4 to which the vehicle 1 is fastened between rigid bar 3 and vehicle 1.

Figure 6:
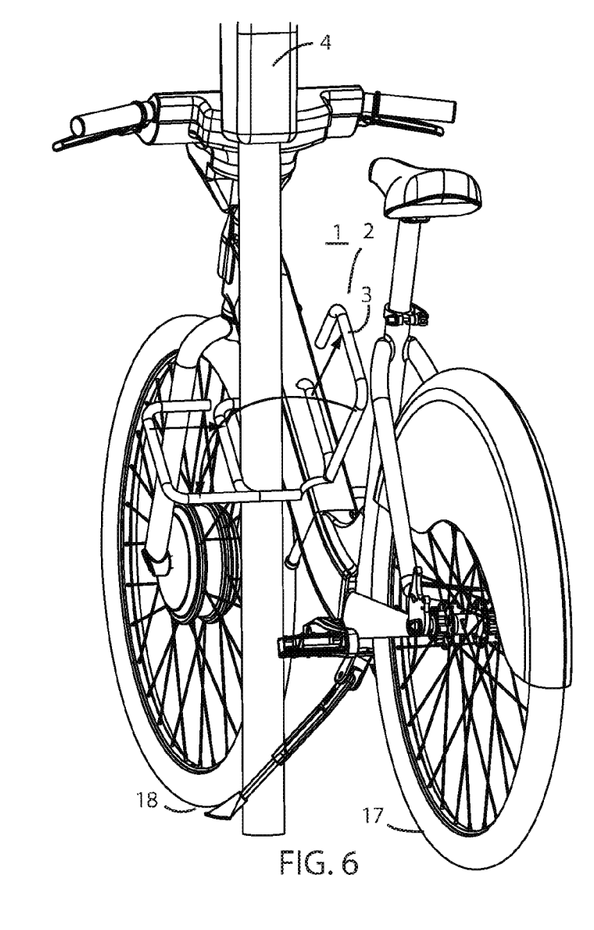
FIG. 6 depicts a perspective view of one example of an on-board locking assembly for the vehicle, where the locking assembly is mounted on a rear luggage carrier, and the vehicle is fastened to an object, in this case a parking meter.

Turning now to FIG. 6, shown is on-board locking assembly 2 mounted to vehicle 1. In this case, rigid bar 3 is positioned in a vertical manner and operation requires pulling rigid bar 3 upward, then pivoting it to the side around object 4, then pushing it inward to the locking position. There are a wide variety of positions in which on-board locking assembly 2 can be mounted to a vehicle 1. In addition, rigid bar 3 can protrude from the side of vehicle 1, or from the front or back of vehicle 1, or from the top of vehicle 1 as shown.

Figure 7:
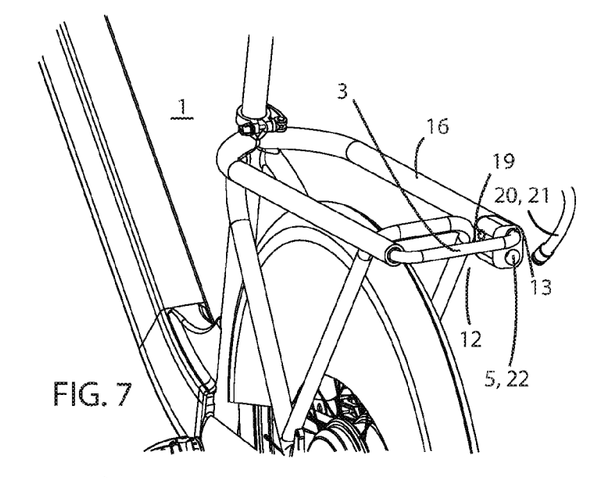
FIG. 7 depicts a perspective view of one example of an on-board locking assembly from FIG. 6, where the locking assembly is mounted on a rear luggage carrier, and the rigid bar is in the riding position.

FIG. 7 shows on-board locking assembly 2 mounted to luggage carrier 16 with rigid bar 3 moving rearward to operate. FIG. 7 shows rigid bar 3 in riding position 12 and receptacle 5 is vacant. However, receptacle 5 and releasable end holder 13 may be one and the same apparatus. In some cases it may be required that vehicle 1 is locked to a station. In this case, station locking member 20, or station locking and charging member 21 can be used if locking and charging is required, in the case of an electric vehicle. In this case receptacle 5 also serves as charging port 22. Also shown is sensor 19 which indicates if rigid bar 3 has captured object 4. This is useful information in case a user fastens rigid bar 3 but does not fasten it to a object 4.

Figure 8:
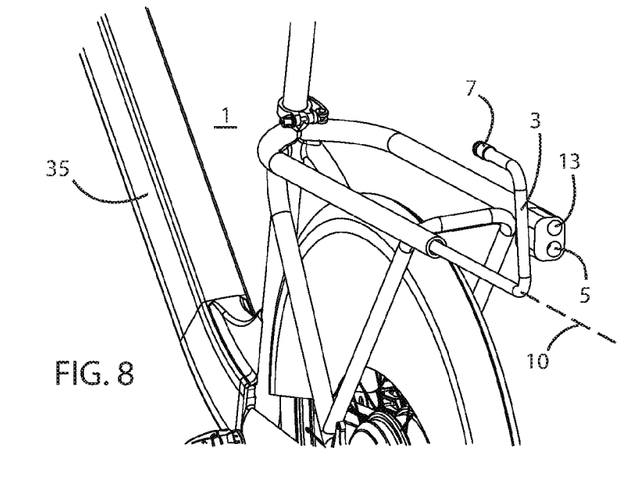
FIG. 8 depicts a perspective view of one example of an on-board locking assembly from FIG. 6, where the locking assembly is mounted on a rear luggage carrier, and the rigid bar has been pulled out and rotated up in order to facilitate the encircling of the object.

FIG. 8 shows rigid bar 3 and rigid bar second end 7 having been removed from releasable end holder 13 and rigid bar 3 having been rotated about the axis coaxial with centerline of first section 10 so as to provide an opening to allow object 4 to enter the area where it may be captured. In this case, rigid bar 3 is generally pulled out, rotated about the axis coaxial with centerline of first section 10, then vehicle 1 is moved to a position where object 4 is in the capture area, and then rigid bar 3 is rotated back so that rigid bar second end 7 can enter receptacle 5. In other words, receptacle 5 and releasable end holder 13 can be close to each other, or far away from each other. Receptacle 5 and releasable end holder 13 can also be at the same location with the same hole.

Figures 9, 10, 11:
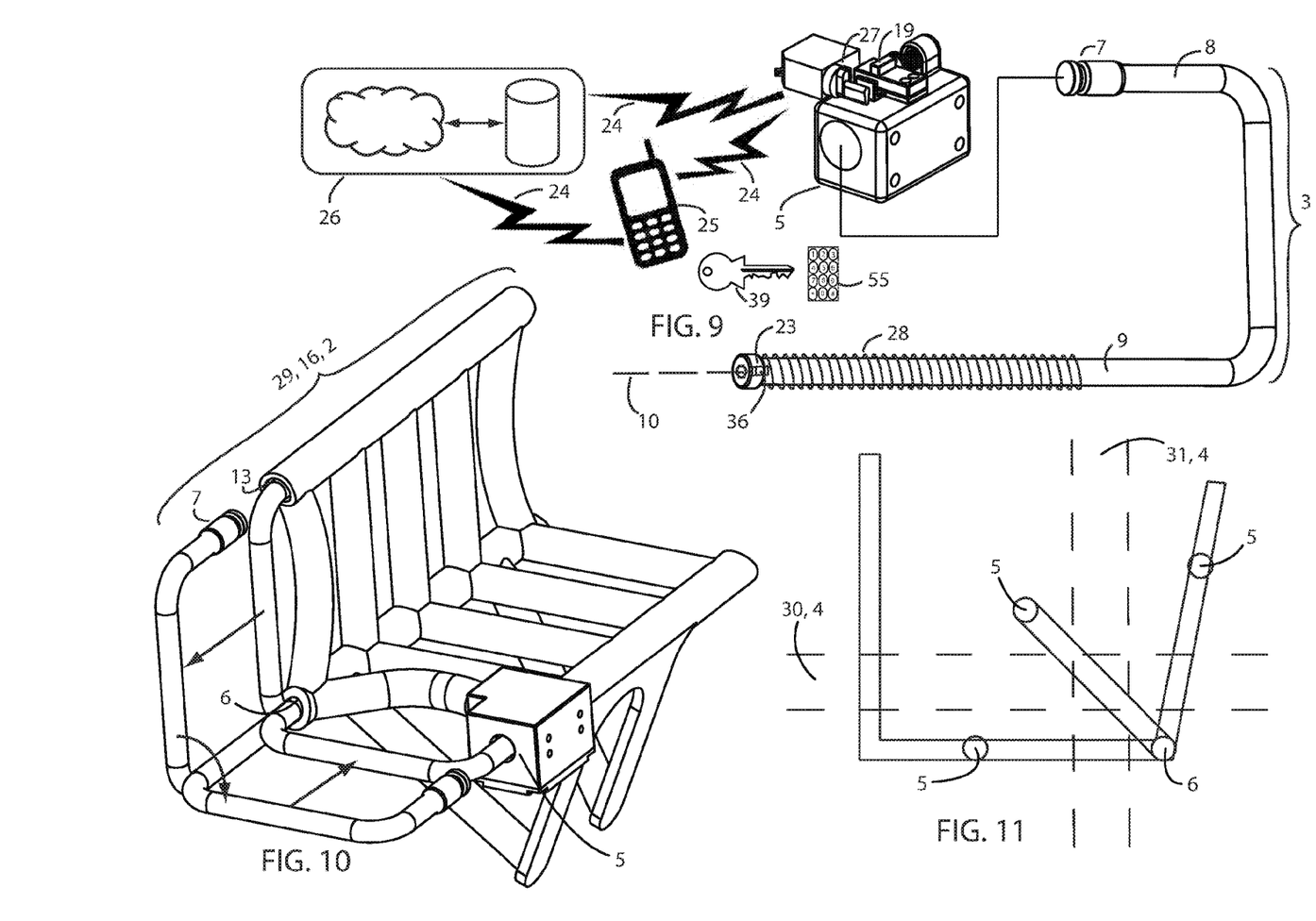
FIG. 9 depicts a perspective view of one example of on-board locking assembly components including a rigid bar in the shape of the letter "J" which has a second end releasable from a receptacle which may be controlled by wireless signal from a user device and/or a server.
FIG. 10 depicts a side view of one example of an on-board locking assembly showing several different options for fastening positions to accommodate both vertical and horizontal objects, and riding positions.
FIG. 11 depicts a side view of one example of an on-board locking assembly showing several different options for fastening position to accommodate both vertical and horizontal objects, and riding positions.

Referring now to FIG. 9, rigid bar 3 and receptacle 5 are shown in an exploded view. Rigid bar 3 incorporates rigid bar second end 7 and second section 8 on one end and first section 9 and rigid bar first end 23 on the other end. Rigid bar first end 23 comprises a mechanism to prevent rigid bar first end 23 from exiting mounting assembly 6, wherein such a mechanism may be a diameter that is larger than the end diameter of mounting assembly 6. Assembly of the structure may be accomplished by fastening a larger diameter component to rigid bar first end 23 after it has been inserted in mounting assembly 6, possibly from the opposite end. As shown, rigid bar second end 7 has a mechanism to allow receptacle 5 to fasten to it, thereby preventing rigid bar second end 7 from exiting receptacle 5 when locking is required. Also shown is angle limiting element 36 which guides rigid bar 3 to the correct angle for insertion into receptacle 5. Rigid bar 3 is shown in the shape of a U, or J, but can be a number of other shapes without departing from the scope of this invention and rigid bar 3 may also represent a station locking member, or a locking and charging member configured as part of a station to fasten vehicle 1 to the station and to charge the vehicle battery. Receptacle 5 may be controlled by local mechanical mechanism (such as key 39), by local electrical mechanism, such as a keyboard code input on keyboard 55, or by wireless signal 24 to a user device 25 and/or to a server 26. Locking and unlocking may be done by a servo motor 27, and the state of locking and unlocking may be reported by sensor 19. Rigid bar 3 may be biased in a certain direction by biasing mechanism 28, and may pivot around the axis coaxial with centerline of first section 10.

Referring now to FIG. 10, shown is a multi-purpose component 29 which is shown as an on-board locking assembly 2 and a luggage carrier 16, but can also be an on-board locking assembly 2 and another vehicle component such as a mudguard/fender (not shown). The on-board locking assembly 2 shown is positioned with mounting assembly 6 in front of receptacle 5. Again, there are multiple configurations of the positions of mounting assembly 6, receptacle 5, and releasable end holder 13, and all of these configuration, while not all shown, do not depart from the scope of this invention.

FIG. 11 shows additional configurations which can accommodate object 4 in a generally horizontal position 30 or a generally vertical position 31, or a variation of object 4 which may not be straight, and may not be horizontal or vertical.

Figures 12, 13:
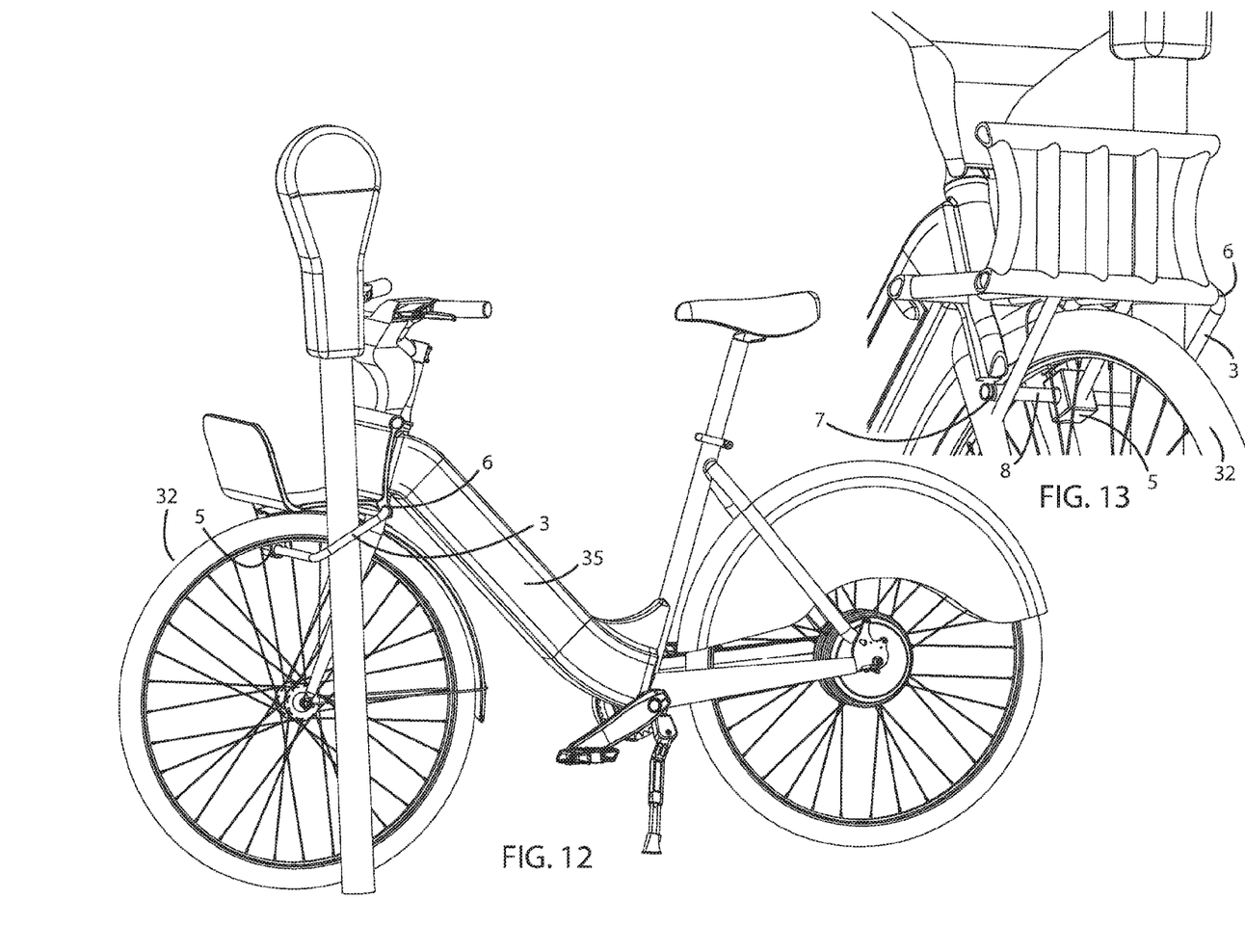
FIG. 12 depicts a perspective view of one example of an on-board locking assembly for a vehicle, shown as an electric bicycle, where the rigid bar has been moved relative to the vehicle to capture the object, in this case a parking meter, to which the vehicle is fastened, and in this case, the rigid bar also prevents the front wheel from rotating, or being removed.
FIG. 13 depicts a front view of one example of an on-board locking assembly for a vehicle, where the rigid bar has been moved relative to the vehicle to capture the object, in this case a parking meter, to which the vehicle is fastened, and in this case, the rigid bar also prevents the front wheel from rotating, or being removed.

Referring now to FIG. 12, shown is receptacle 5 being mounted on the opposite side of vehicle wheel 32 such that rigid bar 3 passes through vehicle wheel 32 to reach receptacle 5 for locking. In this way, when on-board locking assembly 2 is locked, vehicle wheel 32 is unable to rotate, affording an additional level of protection against theft in that a) the vehicle will not roll, and b) the front wheel 18 is fastened to vehicle 1. As shown, rigid bar 3 is mounted on the vehicle left side, and receptacle 5 is mounted on the vehicle right side, however, any number of configurations of mounting assembly 6, receptacle 5, and releasable end holder 13 are again possible without departing from the scope of the invention. In addition, FIG. 13 shows both rigid bar 3 and receptacle 5 mounted on the same side of the vehicle, however rigid bar second end 7 and second section 8 pass through receptacle 5 in the locked position and extend into an area where they block rotation of vehicle wheel 32, again providing additional anti-theft protection. In this configuration, rigid bar second end 7 is not the locking mechanism, but rather a different location fastens to receptacle 5. Finally, FIG. 13 shows mounting assembly 6 being forward of receptacle 5, while FIG. 12 shows mounting assembly 6 being behind receptacle 5.

Figures 14, 15:
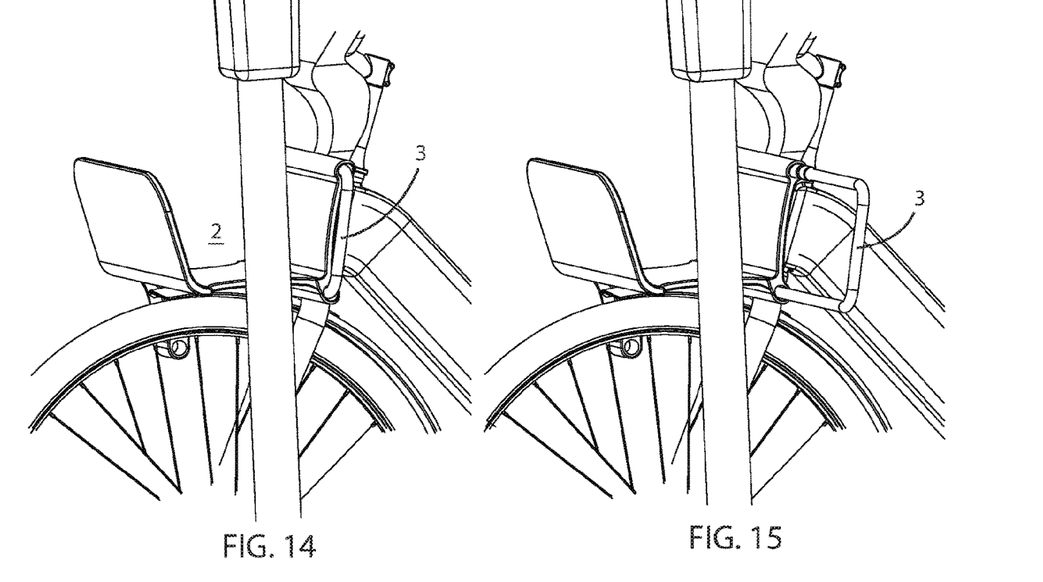
FIG. 14 depicts a perspective view of one example of an on-board locking assembly for the vehicle shown in FIG. 12, where the rigid bar is in the riding position. It is the first of a sequence of four figures showing the process of fastening the vehicle to the object.
FIG. 15 depicts a perspective view of one example of an on-board locking assembly for the vehicle shown in FIG. 12, where the rigid bar has been pulled outward from the riding position. It is the second of a sequence of four figures showing the process of fastening the vehicle to the object.
Figure 16:
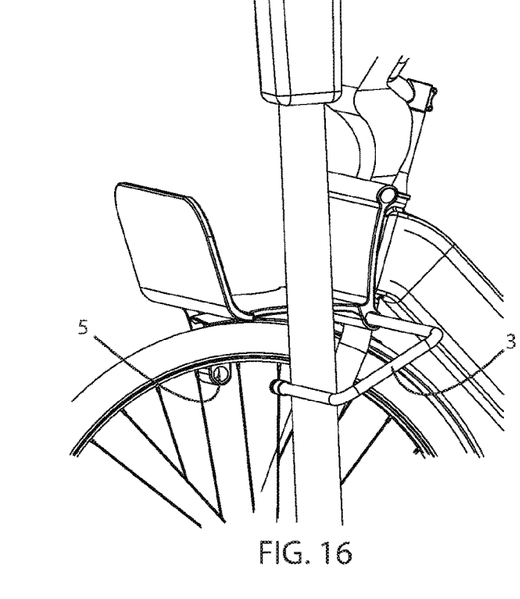
FIG. 16 depicts a perspective view of one example of an on-board locking assembly for the vehicle shown in FIG. 12, where the rigid bar has been pulled outward and rotated down from the riding position. It is the third of a sequence of four figures showing the process of fastening the vehicle to the object.
Figure 17:
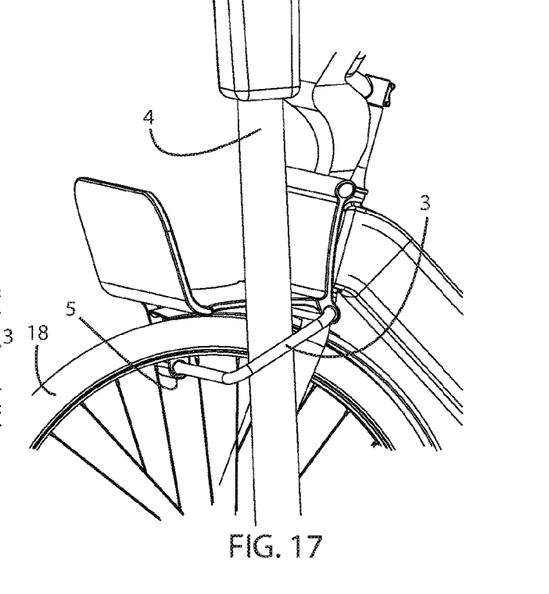
FIG. 17 depicts a perspective view of one example of an on-board locking assembly for the vehicle shown in FIG. 12, where the rigid bar is in the fastened position in the receptacle. It is the fourth of a sequence of four figures showing the process of fastening the vehicle to the object.

Referring now to FIGS. 14 through 17, shown is vehicle 1 with on-board locking assembly 2 from FIG. 12 wherein FIG. 14 shows rigid bar 3 in the riding position, FIG. 15 shows rigid bar 3 having been pulled outward, FIG. 16 shows rigid bar 3 having been rotated down to a position ready to enter receptacle 5, and finally FIG. 17 shows rigid bar 3 having been inserted into receptacle 5. In this position, due to receptacle 5 being situated on the opposite side of front wheel 18, vehicle 1 is locked to object 4 and front wheel 18 is prevented from rotating.

Figures 18, 19, 20:
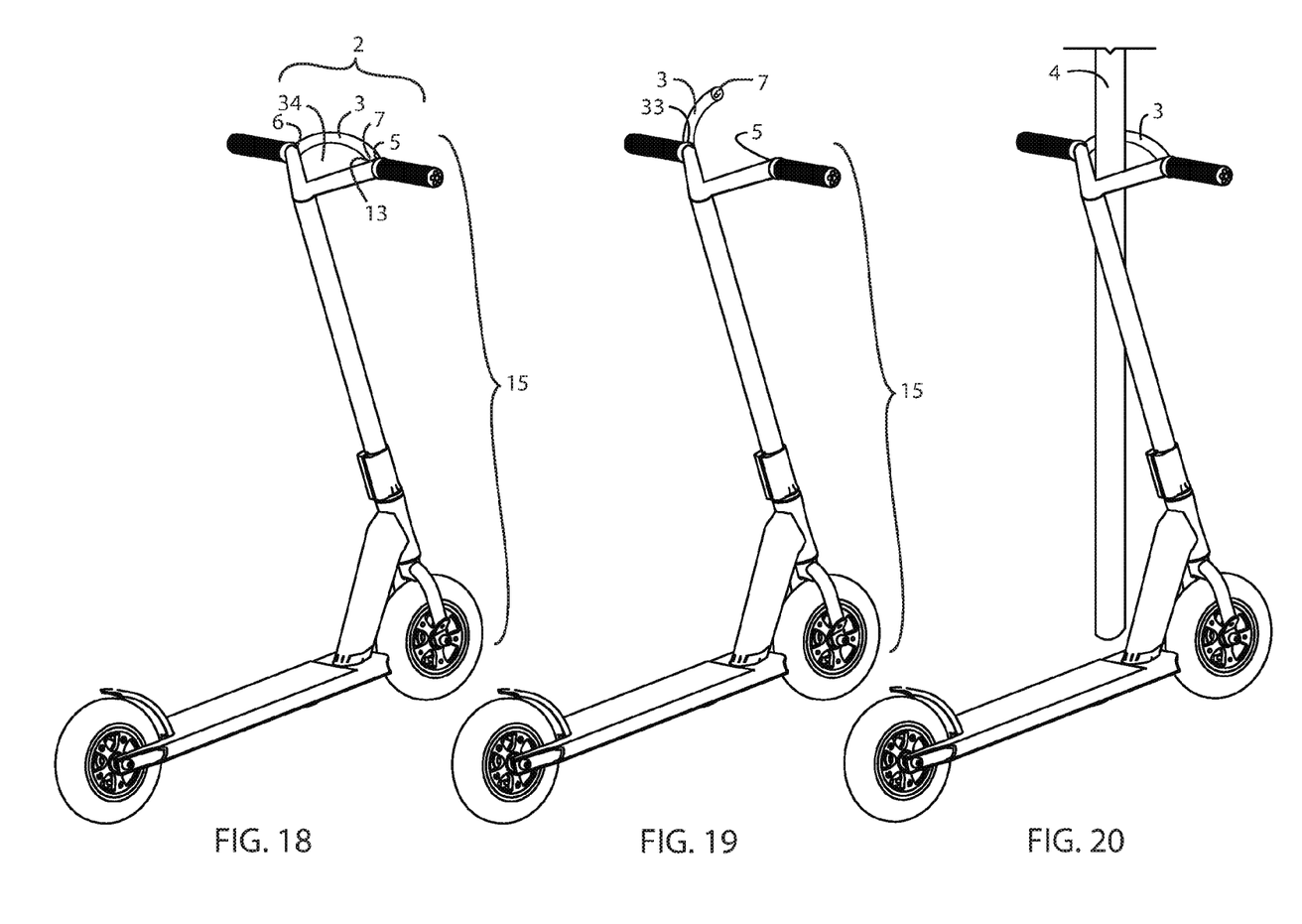
FIG. 18 depicts a perspective view of one example of an on-board locking assembly for a vehicle, shown as a scooter (electric, or non-electric), where the rigid bar is in the riding position. It is the first of a sequence of three figures showing the process of fastening the vehicle to the object.
FIG. 19 depicts a perspective view of one example of an on-board locking assembly for a vehicle, shown as a scooter (electric, or non-electric), where the rigid bar is mounted to the vehicle mounting assembly in a pivoting manner, and has been pivoted to a position ready to capture an object. It is the second of a sequence of three figures showing the process of fastening the vehicle to the object.
FIG. 20 depicts a perspective view of one example of an on-board locking assembly for a vehicle, shown as a scooter (electric, or non-electric), where the rigid bar is mounted to the vehicle mounting assembly in a pivoting manner, and has been pivoted to a fastened position encircling an object. It is the third of a sequence of three figures showing the process of fastening the vehicle to the object.

There is a specific need for an on-board locking system for a scooter. An example of such a locking system is shown in FIGS. 18 through 20. A rigid bar 3, or a flexible cable 3 is mounted on a pivoting mount on the vehicle steering assembly 15, preferably on the handlebar, with one end releasable, and one end pivotably mounted. The handlebar may be configured with a void in the middle for easier accommodation of an object 4 such as to a pole, to which the scooter is locked. Alternatively, the handlebar may be contiguous across the middle in a generally straight configuration, and the rigid bar 3, or flexible cable 3 may be longer with a bigger radius to accommodate an object. Such a scooter can be a shared vehicle that is rented, and generally left on the street, or a private vehicle. It can be a push scooter, or a scooter with a battery and motor. It is shown without a seat, but the addition of a seat is possible.

Referring to FIGS. 18 through 20, shown is vehicle 1 being an electric or non-electric scooter. Vehicle steering assembly 15 is equipped with on-board locking assembly 2 wherein rigid bar 3 is mounted to mounting assembly 6 in pivoting manner 33. Rigid bar second end 7 is releasable from receptacle 5 to allow object 4 to enter object area 34 to lock vehicle 1. As shown, releasable end holder 13 and receptacle 5 are one and the same, but they can also be different. This simple intuitive method of locking a vehicle 1 such as a scooter is easy to use, and allows for quick, and usually wireless controlled locking and unlocking of the vehicle 1.

Figure 21:
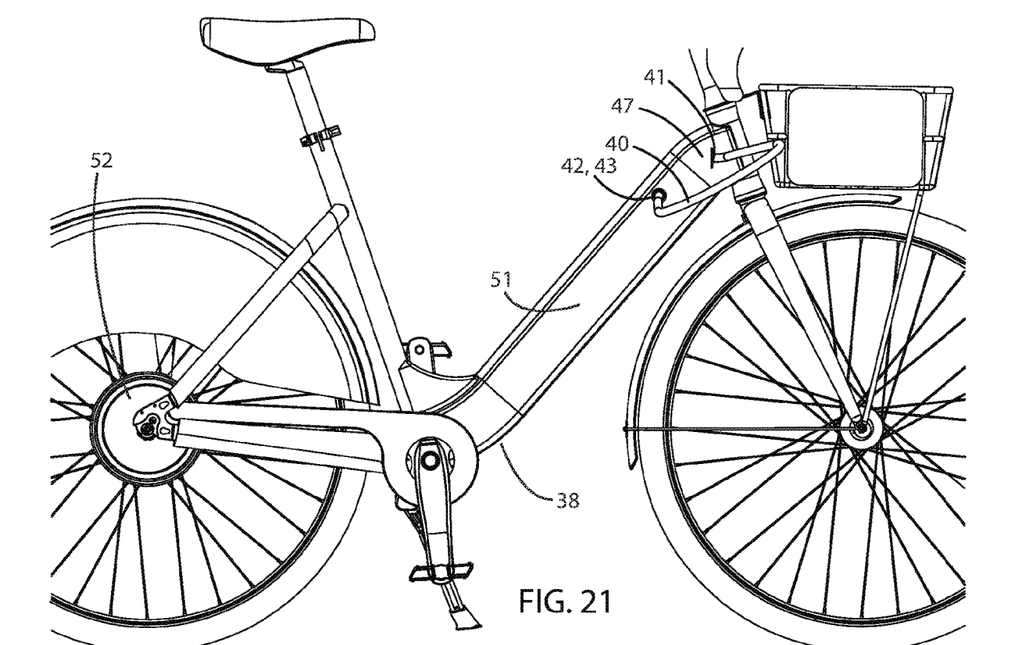
FIG. 21 depicts a side view of one example of an on-board locking assembly for a vehicle, shown as an electric bicycle, where the on-board retractable cable has been extended relative to the vehicle to capture the object to which the vehicle would be fastened.
Figure 22:
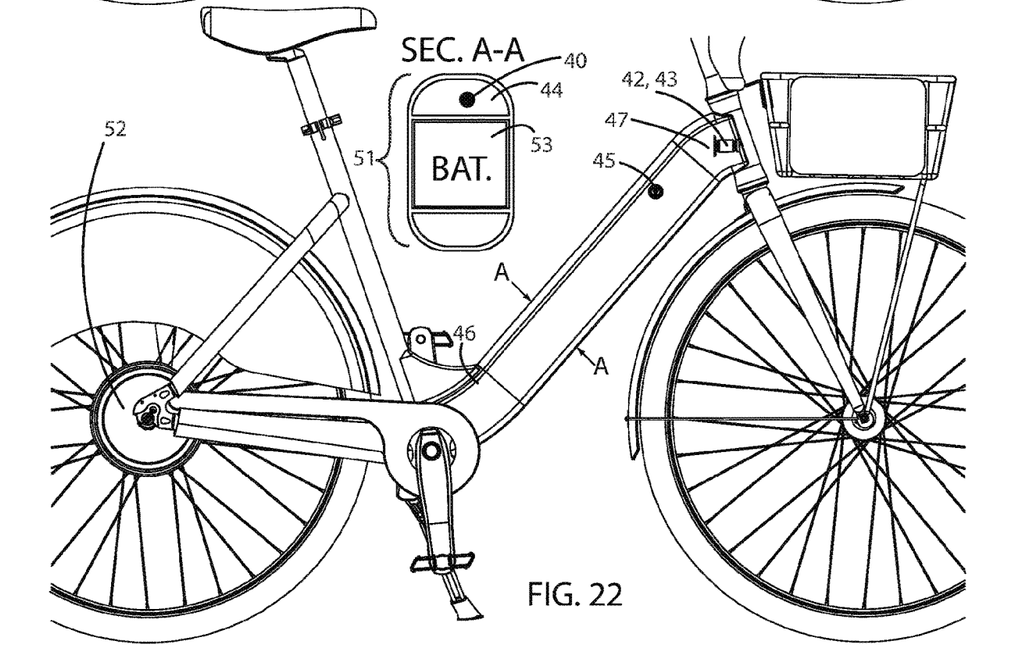
FIG. 22 depicts a side view of one example of an on-board locking assembly for a vehicle, shown as an electric bicycle, where the on-board retractable cable has been retracted into the vehicle frame.

In some cases it may be desirable to use a cable to lock a vehicle 1, such as a bicycle 37, in a public place. FIG. 21 and FIG. 22 show bicycle 37 with bicycle frame 38 equipped with retractable cable 40. FIG. 21 shows retractable cable 40 in a extended position capturing an object 4 (not shown for clarity). Retractable cable 40 has been extended until cable first end 41 reaches storage element second end 47. Cable second end 42, with locking cable end 43, is fastened to cable end receiver 45. In this case cable storage element 44 is comprised of down tube 51 of bicycle 37 with storage element first end 46 nearer to the back end of bicycle 37 and storage element second end 47 nearer to the front end. FIG. 22 shows Section A-A with battery 53 mounted inside down tube 51 and retractable cable 40 positioned in cable storage element 44. Retractable cable 40 is retracted inside down tube 51. Shown is an electric bicycle with electric motor 52 in the rear hub, however, any number of other configurations are possible, including mounting electric motor 52 in the front hub, or in a mid-drive configuration. In addition, a pedal bicycle is possible with no electric motor, and all the mentioned configurations do not depart from the scope of this invention.

Figure 23:
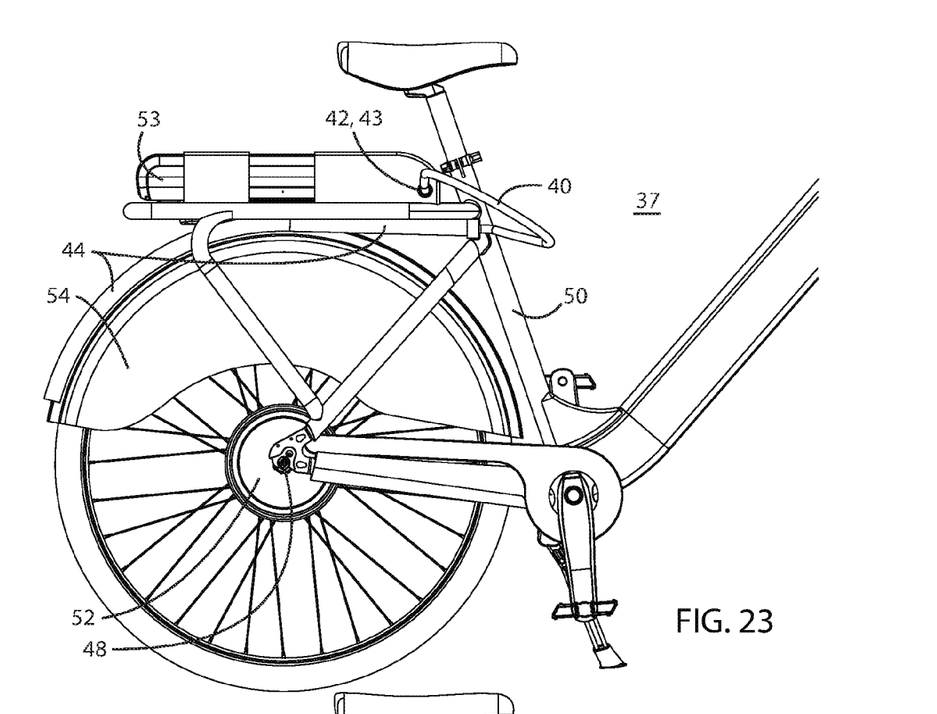
FIG. 23 depicts a side view of one example of an on-board locking assembly for a vehicle, shown as an electric bicycle, where the on-board retractable cable has been extended relative to the vehicle to capture the object to which the vehicle would be fastened.
Figure 24:
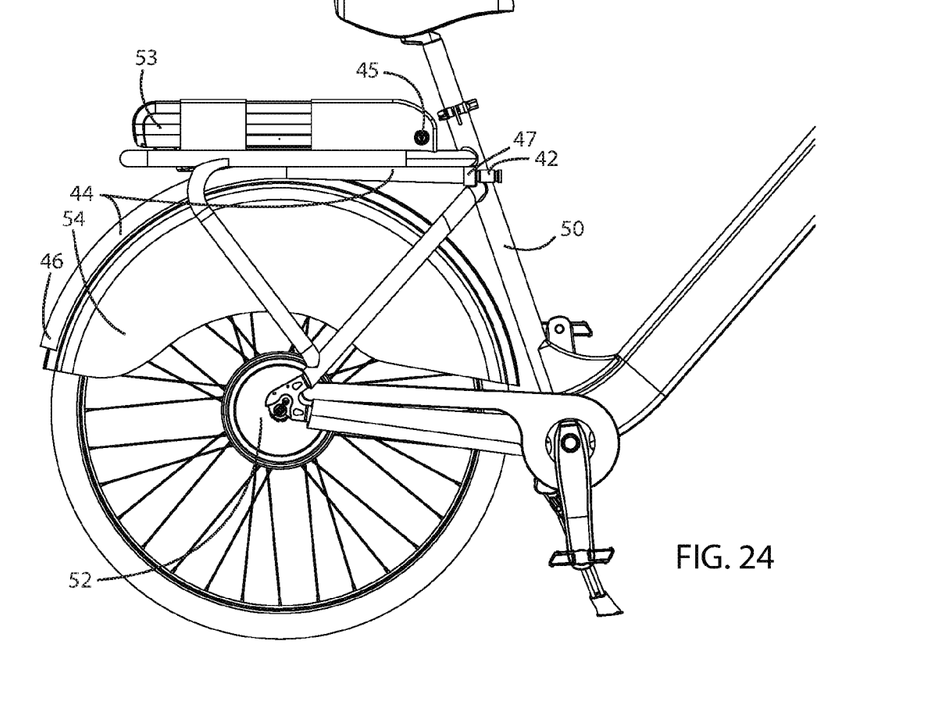
FIG. 24 depicts a perspective view of one example of an on-board locking assembly for the vehicle shown in FIG. 23, where the on-board retractable cable has been retracted.

Referring now to FIG. 23 and FIG. 24, shown is bicycle 37 with battery 53 mounted on a rear rack, and cable storage element 44 with storage element second end 47 mounted on or near seat tube 50, and cable second end 42 with locking cable end 43 extending forward. Cable storage element 44 is configured with a forward part generally linear and parallel to the direction of travel of bicycle 37, and a rear portion positioned radially around rear wheel rotational axis 48. Electric motor 52 is shown in the rear wheel. Rear wheel fender 54 supports, or is integral with cable storage element 44. FIG. 23 shows retractable cable 40 extended for locking around object 4 (not shown for clarity) while FIG. 24 shows retractable cable 40 retracted into cable storage element 44.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An on-board locking assembly for a vehicle comprising;
    a flexible cable movably mounted to said vehicle,
    a flexible cable first end connected to said vehicle,
    a flexible cable second end releasable from said vehicle,
    a mounting assembly for movably mounting said flexible cable first end,
    a receptacle mounted on said vehicle configured to receive said flexible cable second end,
    wherein said flexible cable is configured to be movable relative to said vehicle to capture an object to which said vehicle may be fastened between said flexible cable and said vehicle,
    wherein said flexible cable second end is configured to fasten to said receptacle, and wherein at least one of locking and unlocking of said locking assembly is controlled by wireless signal by a user device and/or a server.

2. The on-board locking assembly of claim 1 wherein said receptacle is further configured to receive a docking locking member configured as part of a docking station to fasten said vehicle to said docking station.

3. The on-board locking assembly of claim 2 further comprising a vehicle electric motor and battery, wherein said receptacle is further configured to be a charging port to receive a docking station locking and charging member configured as part of a station to fasten said vehicle to said docking station and to charge said vehicle battery.

4. The on-board locking assembly of claim 1 further comprising a vehicle luggage carrier, wherein said mounting assembly is mounted to said vehicle luggage carrier.

5. The on-board locking assembly of claim 1 further comprising one or more sensors, wherein said one or more sensors are configured to sense at least one of the presence of said object when said flexible cable is fastened around said object, and the presence of said flexible cable second end when inserted in said receptacle.

6. The on-board locking assembly of claim 1 wherein said vehicle is a bicycle.

7. The on-board locking assembly of claim 1 wherein said vehicle is a scooter.

8. A method for locking an on-board vehicle lock comprising;
    a flexible cable movably mounted to said vehicle,
    a flexible cable first end connected to said vehicle,
    a flexible cable second end releasable from said vehicle,
    a mounting assembly for movably mounting said flexible cable first end,
    a receptacle mounted on said vehicle configured to receive said flexible cable second end,
    wherein said flexible cable is moved relative to said vehicle to capture an object to which said vehicle may be fastened between said flexible cable and said vehicle,
    wherein said flexible cable second end is fastened to said receptacle,
    and wherein at least one of locking and unlocking of said locking assembly is controlled by wireless signal by a user device and/or a server.

* * * * *